(12) United States Patent
Sporstøl et al.

(10) Patent No.: US 12,392,010 B2
(45) Date of Patent: Aug. 19, 2025

(54) STATIONARY PHASE FOR PREPARATIVE SEPARATION OF RARE EARTH METALS

(71) Applicant: REEtec AS, Oslo (NO)

(72) Inventors: Sigve Sporstøl, Hagan (NO); Dejene Kifle, Alexandria, VA (US)

(73) Assignee: REEtec AS, Oslo (NO)

( * ) Notice: Subject to any disclaimer, the term of this patent is extended or adjusted under 35 U.S.C. 154(b) by 675 days.

(21) Appl. No.: 17/783,612

(22) PCT Filed: Dec. 9, 2020

(86) PCT No.: PCT/EP2020/085311
§ 371 (c)(1),
(2) Date: Jun. 8, 2022

(87) PCT Pub. No.: WO2021/116185
PCT Pub. Date: Jun. 17, 2021

(65) Prior Publication Data
US 2023/0226521 A1    Jul. 20, 2023

(30) Foreign Application Priority Data
Dec. 12, 2019   (NO) .................................. 20191473

(51) Int. Cl.
| | | |
|---|---|---|
| *B01J 20/283* | (2006.01) | |
| *B01D 15/32* | (2006.01) | |
| *B01J 20/287* | (2006.01) | |
| *B01J 20/32* | (2006.01) | |
| *C22B 3/24* | (2006.01) | |
| *C22B 3/38* | (2006.01) | |

(52) U.S. Cl.
CPC ............... *C22B 3/24* (2013.01); *B01J 20/283* (2013.01); *B01J 20/287* (2013.01); *B01J 20/3204* (2013.01); *B01J 20/3246* (2013.01); *B01D 15/327* (2013.01)

(58) Field of Classification Search
CPC ......... C22B 3/24; B01J 20/283; B01J 20/287; B01J 20/3204; B01J 20/3246; C01F 17/10
See application file for complete search history.

(56) References Cited

U.S. PATENT DOCUMENTS 4,752,459 A    6/1988   Pepper

FOREIGN PATENT DOCUMENTS

| EP | 0103875 A2 | 3/1984 |
|---|---|---|
| GB | 2168045 A | 6/1986 |

OTHER PUBLICATIONS

Kifle Dejene et al., Solvent Extraction and Ion Exchange, (2013), 31(6), 668-682. (Disclosed in IDS, and provided by Applicant).*
Kifle, Dejene, et al., "Impregnation and Characterization of High Performance Extraction Columns for Separation of Metal Ions", Solvent Extraction and Ion Exchange, [Online] vol. 31, No. 6, Oct. 1, 2013, pp. 668-682, XP055791145, US, ISSN: 0736-6922.
Kaluza, Nicoleta; International Search Report; PCT/EP2020/085311; dated Mar. 31, 2021; 3 pages.
Ramzan, Muhammad, et al., "Comparative Study of Stationary Phases Impregnated with Acidic Organophosphorus Extractants for HPLC Separation of Rare Earth Elements", Separation Science and Technology, vol. 51, 2016—Issue 3, accessed Jul. 20, 2020 at https://doi.org/10.1080/01496395.2015.1112400.

* cited by examiner

*Primary Examiner* — Yong L Chu
(74) *Attorney, Agent, or Firm* — Bradley Arant Boult Cummings LLP

(57) ABSTRACT

Stationary phase for preparative High Pressure Liquid Chromatography (HPLC) for preparative separation of Rare Earth Elements (REEs), the stationary phase comprising porous particles suitable for HPLC having a non-polar surface being impregnated with ligands binding REEs, wherein the porous particles has a pore size of 300 Å or higher, is described.

6 Claims, No Drawings

STATIONARY PHASE FOR PREPARATIVE SEPARATION OF RARE EARTH METALS

TECHNICAL FIELD

The present invention relates to a stationary phase for industrial scale, chromatographic, preparative separation of rare earth metals. More specifically the invention relates to a stationary phase for separation of rare earth elements and of other metals that might be present in typical rare earth feedstock.

BACKGROUND ART

Rare earth elements (REEs) are a group of metals that play a key role in our modern world. They are crucial components of many emerging high technological and new energy industries due to their unique nuclear, metallurgical, chemical, catalytic, electrical, magnetic, and optical properties and there are generally no substitutes for them. According to a report from the United States Department of Energy 2017, the annual growth in demand for REEs from the technology industries is over 5%.

Applications of REEs depend not only on their characteristics, but also on their purity. Hence, their market price increases significantly with demand on purity. The sources of rare-earth elements are minerals and secondary materials consisting of mixtures of several REEs. To be used in high-tech applications, it is therefore necessary to separate them from their respective matrix components and from each other at high degree of purity. Due to their similar physicochemical properties, however; separation of REEs is not easy and has remained as a very challenging industrial problem.

The Rare Earth Elements comprise, as defined herein, the lanthanides, i.e. the elements No. 57 to 71 in the periodic table of elements, in addition to scandium and yttrium, elements No. 21 and 39, respectively, in the periodic table of elements. Scandium and yttrium are here considered as REEs as they tend to be present in the same ore deposits as the lanthanides, and exhibit similar chemical properties.

In nature REEs are found as components in a range of minerals, typically as halides, carbonates, oxides, phosphates, and silicates. The most important sources for REEs are, however, the minerals bastnäsite, monazite and xenotime. Typically, these minerals comprise several percent by weight of REEs. Dependent on the specific ore, the distribution between the different REEs may differ substantially.

Commercial production of individual REEs starts with the mining process where the ore material is crushed and milled to appropriate particle sizes. This is normally followed by further processing aiming at separating out the minerals that contain the REEs. The processing steps for enrichment of the REE containing minerals typically comprise gravity separation, flotation and magnetic separation. Fairly pure concentrates of the REE carrying minerals can be produced by these means.

The ore concentrates are thereafter cracked by treating them with strong acids/bases at elevated temperature. Typical chemicals to be used are HCl, $H_2SO_4$, $HNO_3$ and/or NaOH.

The REE is thereafter leached from the cracked ore concentrate, normally by using diluted inorganic acids.

Other metal ions from the ore are also leached out during the leach process. The REE concentrates will therefore also typically contain a range of other metal such as for example Na, K, Mg, Ca, Fe, Ni, Cu, Zn, Al, Si, Th and U, dependent on the composition of the ore.

The various REE concentrates are thereafter treated in order to remove or separate the other metals that are present. This is normally done by using a combination of liquid/liquid extraction (LLE) and selective precipitation.

Recycling is also an emerging source of REEs, particularly from energy efficient lamps, magnets and batteries. The recycling processes are complex and include a number of steps in order to produce a concentrate containing REEs. The concentrate will normally also contain a range of other metals originating from the recycled consumer products. The same type of combination of LLE and fractional precipitation is used to separate out the other metals and thereafter to separate the REEs into separate metals.

Until the early 1950s fractional precipitation and fractional crystallization were the only techniques available for separating REEs. These processes have, however, been superseded by more effective technologies. The dominating rare earth separation technology today is liquid/liquid extraction (LLE), which requires large mixer-settler arrangements with numerous extraction stages and where each plant is tailor made to a certain raw material and a certain purity of the separated products. Other disadvantages with this technology are high consumption of process chemicals and HSE challenges related to the use of large amounts of solvents.

Extraction chromatography (ExC) was originally developed in the 1940s for analysis of fission products. In ExC the packing material in the separation column is impregnated with appropriate organic, hydrophobic complexing agents (extractant; the same type of chemicals that are used in LLE), which serves as the stationary phase while mineral acids are used as eluents. This method gives excellent separation between the various rare earth components but is only used for analytical purposes or highly specialized preparative purposes since it gives too low productivity to be commercially interesting.

The hydrophobic extractant is either chemically bonded or physically immobilized on reverse phase (RP) stationary support. Chemical bonding of the extractant on RP-phase support is usually complex and time consuming compared to the physical process as it involves synthesizing of the stationary phase. Due to its simplicity and ease, the concept of physically immobilizing, also called impregnating, of the hydrophobic complexing agents on reversed-phase RP-support is thus a more attractive approach.

There are also a few published examples where the authors have exceeded the analytical range. HPLC has, however, never been developed into an industrial scale separation technology for REE and other metals in spite that its abilities for analytical scale separation has been known since the 1970ties.

Ramzan M. et al, Comparative study of stationary phases impregnated with acidic organophosphorous extractants for HPLC separation of rare earth elements, Separ. Sci. Technol. 206, vol. 51, no. 3, p. 494-201, ISSN 1520-5754, describes use of separation columns packed with porous silica particles which have been surface modified by C18 hydrocarbons. The particles are impregnated with organophosphoric acids. However, this publication explicitly teaches use of silica particles with a pore size of 100 Å.

An overview of the state of the art in HPLC separation of REE is given by one of the inventors, D. Kifle, in a dissertation for the degree of Philosophiae Doctor (Ph. D.) (D. Kifle in "Separation of rare earth elements and other precious metals by high performance liquid chromatograph and solid phase extraction: Development of methodologies for analyses and potential preparative use", dissertation for the degree of Philosophiae Doctor (Ph. D.), University of Oslo, Norway, August 2013.)

The thesis of D. Kifle concluded i.a. with that preparative HPLC separation of REEs using a solid phase impregnated with acidic organo-phosphorous extractant known as REE extractants, was promising for industrial scale HPLC separation of REEs. However, later tests have shown that the capacity of the solid phase as described therein, is too low for competing with the presently most used extraction methods mentioned above.

GB 2168045 A describes a porous material for production and separation of metals by means of chromatography. The porous material can be silica and can have an average pore size of 20-2000 nm (200-20000 Å). This material is suited for separation of REE's.

EP 0103875 A2 describes a packing material for chromatographic separation of comprising a fibrous and a granulated material. It is mentioned that the granular porous material can have a pore size of 3-5000 Å. Further it is mentioned that the material can be used in relation to separation of REE's.

An object of the present invention is to develop a solid phase having a substantially improved capacity for separation of groups of and/or individual REEs by HPLC, and to avoid or substantially reduce the problems and weak points associated with the technologies of the prior art.

Other objects will be apparent to the skilled person by reading the present description.

SUMMARY OF INVENTION

According to a first aspect of the present invention, the invention relates to a stationary phase for preparative High Pressure Liquid Chromatography (HPLC) for preparative separation of Rare Earth Elements (REEs), the stationary phase comprising porous particles suitable for HPLC having a non-polar surface being impregnated with ligands binding REEs, wherein the porous particles are porous silica particles having a surface modified by hydrocarbons to make the surface thereof non-polar and suitable for binding of the ligands binding REEs, that the porous particles have a pore size of 300 Å or higher and the ligand binding REEs is an acidic organo-phosphorous compound.

It was unexpectedly found that porous particles having smaller pore size, i.e. having a larger surface area, had far less capacity for binding REEs than particles having larger pore size. This was contrary to the normal teaching, which is that the larger surface are/the smaller pore size the particles forming the stationary phase in chromatography, the larger the binding capacity is.

According to one embodiment, the pore size is 700 Å or more, such as 1200 Å or higher. It was found during the extensive work leading to the present invention, that particles for liquid chromatography having a pore size between 700 Å and 1200 Å had maximum capacity for binding REEs to such a stationary phase According to another embodiment, the hydrocarbons have a chain length from 8 to 18 C atoms.

According to yet an embodiment the acidic organo-phosphorous compound is selected from di-(2-ethylhexyl) phosphoric acid (DHEHP), di-(2,4,4-trimethylpentyl) phosphinic acid (H[TMPeP]) and 2-ethylhexyl, 2-ethylhexyl phosphonic acid (H[(EH)EHP]).

According to a specific embodiment, the acidic organo-phosphorous compound is di-(2-ethylhexyl) phosphoric acid (DHEHP).

According to a second aspect, the present invention relates to a use of silica particles to prepare stationary phase for separation of REEs, wherein the silica particles having a pore size larger than 300 Å are modified by binding of hydrocarbon chains to the polar silica surface, and the modified silica particles are impregnated with an acidic organo-phosphorous compound.

The acidic organo-phosphorous compound is preferably selected from di-(2-ethylhexyl) phosphoric acid (DHEHP), di-(2,4,4-trimethylpentyl) phosphinic acid (H[TMPeP]) and 2-ethylhexyl, 2-ethylhexyl phosphonic acid (H[(EH)EHP]).

Preferably, the acidic organo-phosphorous compound is di-(2-ethylhexyl) phosphoric acid (DHEHP).

DETAILED DESCRIPTION OF THE INVENTION

According to the present invention the cyclic capacity of an industrial scale preparative HPLC column is increased by increasing the amount of extractant that can be placed on the reverse phase (RP) silica particles, which is commonly used as a stationary phase/support in chromatography.

Reverse phase silica particles, are commercially available from different sources, and are commonly used as stationary phase in chromatography, and are prepared by modifying silica particles which have a polar surface, by binding alkyl groups to the surface thereof as follows:

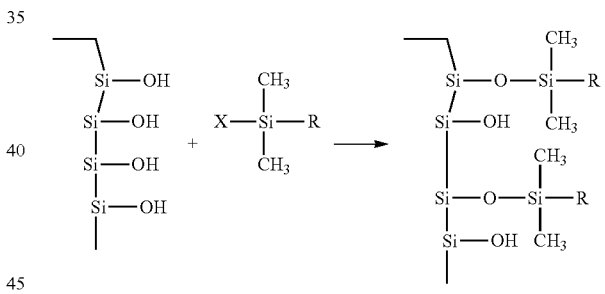

where R typically is an alkyl chain of 4, 8 or 18 C atoms.

Such modified silica particles are commonly used for chromatographic separation of compounds having different affinity for the modified non-polar particle surface. The modified silica particles may also be used for immobilization of ligands having non-polar ends to these modified particles by means of van der Waals binding.

In extraction chromatography (ExC) an organic compound with complex forming property is physically immobilized or chemically bonded on reverse phase (RP) solid support is used as a stationary phase and mineral acid as a mobile phase. Complex forming organic compounds typically utilized for separation of REEs include acidic organo-phosphorous extractants and the most commonly used once are di-(2-ethylhexyl) phosphoric acid (DHEHP), di-(2,4,4-trimethylpentyl) phosphinic acid (H[TMPeP]) and 2-ethylhexyl, 2-ethylhexyl phosphonic acid (H[(EH)EHP]). FIG. 1 presents the molecular structure of these extractants. The mineral acid can be nitric acid (HNO3), hydrochloric acid (HCl) or sulfuric acid ($H_2SO_4$).

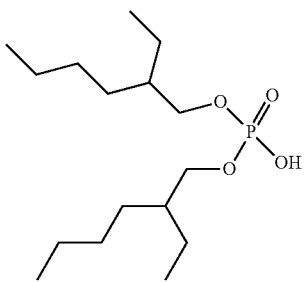

Di-(2-ethylhexyl) phosphoric acid (HDEHP)

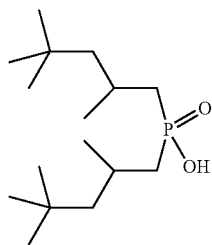

Di-(2,4,4-trimethylpentyl) phosphinic acid (H[TMPeP])

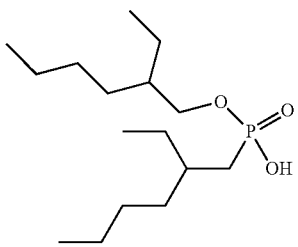

2-ethylhexyl, 2-ethylhexyl phosphonic aci (H[EH]EHP])

Molecular Structures of Acidic Organo-Phosphorous Extractants Used in Separation of REEs Equation-1, below, shows the general formula believed to be responsible for separation of rare earth elements (REEs) by ExC using HDEHP (the most common extractant) as a stationary phase (extractant) and mineral acid as a mobile phase (eluent).

$$RE^{+3}_{(aq)} + 3(HDEHP)_{(org)} \leftrightarrow RE(DEHP)_{3(org)} + 3H^+_{(aq)} \quad (Eq\text{-}1)$$

The extractant (HDEHP) is considered as mono-ionizable molecule and three molecules are bound with one REE cation by breaking hydrogen bonds and via the oxygen atoms formerly bound by the exchanged protons.

The equilibrium constant (K) of Eq-1, which is also known as the stability constant of the metal-extractant complex is described by Eq-2.

$$K = [RE(DEHP)_3]_{org} * [H^+]_{3aq} / [RE^{3+}]_{aq} * [HDEH]_{3org} \quad (Eq\text{-}2)$$

The distribution ratio (D) which is the measure of distribution of a solute in two immiscible solvents can be calculated by dividing the total concentration of the extracted metal ion in the organic phase by the total concentration in the aqueous phase. In column extraction chromatography, this is the same as the ratio of molar concentration of the metal ion in the stationary phase (i.e., the extractant impregnated on support) to molar concentration of the metal ion in the mobile phase (the eluent acid).

$$D = [RE(DEHP)_3]_{org} / [RE^{3+}]_{aq} \quad (Eq\text{-}3)$$

Dividing Eq-3 by Eq-2 and rearranging gives Eq-4

$$D = K * [HDEHP]_{3org} / [H^+]_{3aq} \quad (Eq\text{-}4)$$

The distribution ratio (D) may also be mathematically related to certain column parameters, such as retention volume (Vr) and volume of the stationary phase (Vs) as shown in Eq-6.

$$D = Vr/Vs \quad (Eq\text{-}5)$$

Assuming that retention volume (Vr) is equal to retention time (tR) and combining Eq-5 with Eq-4, results in Eq-6

$$tR/Vs = K * [HDEHP]_{3org} / [H^+]_{3aq} \quad (Eq\text{-}6)$$

Taking the log value of the equations and after rearranging takes the form $$\log tR = 3 \log [HDEHP] - 3 \log [H^+] + \log Vs + K \quad (Eq\text{-}7)$$

Eq-7 shows that the retention time (tR), which is also known as capacity factor has a direct third-order dependence on the molar concentration of the extractant and direct first-order dependence on the of volume of the stationary phase (Vs). This clearly shows that the greater the amount of extractant on the column the greater is the column capacity in terms of sample throughput (sample load) or in other words greater production capacity.

The present inventors have made numerous experiments where they have varied different parameters to study the effect of the parameters on the capacity to bind REEs.

The present inventors have previously investigated impregnation behaviors of bulk RP-silica materials and pre-packed HPLC columns based on batch and flow-through impregnation techniques, respectively using Di-(2-ethylhexyl) phosphoric acid (HDEHP), which is commonly used in separation of REEs, as a model extractant. The study revealed that the extractant is adsorbed on the RP-silica material as mono-layer thin film as the isotherms exhibited a typical characteristic of type-I adsorption according to IUPAC classification of physical adsorption isotherms of pure fluids. The same study shows that the amount of extractant adsorbed on the RP-silica particles was increasing concurrently with the concentration of HDEHP in the impregnation solution and under the same impregnation condition the amount of extractant adsorbed on C18-silica material was slightly higher compared to C8-silica. The study also revealed that the extraction columns prepared by physical impregnation method showed high stability under water and high acidic conditions and when needed can easily be regenerated and to the original state by re-impregnation.

The present invention is based on further experiments studying the effect of different RP-silica parameters such as surface area, pore size, pore volume, carbon content and carbon coverage on the impregnation efficiency of HDEHP. The size of the particles was kept at 10 μm. Owing to its simplicity, speed and ease of process, a flow-through technique is employed as the impregnation method. In accordance with the previous test result mentioned above, undiluted HDEHP was used as impregnation solvent and tailor-made HPLC columns packed with C18-silica material of various specifications as adsorbent.

Experimental

Extractant and HPLC Columns

Di-(2-ethylhexyl) phosphoric acid (HDEHP) of 99% purity was purchased from Sigma Aldrich (Germany). Deionized water obtained from a Millipore® Milli-Q system was used throughout. All HPLC columns have a dimension of 1 cm×25 cm contained about 3.66 g C18-silica material.

Particle and bonded phase specifications of the different HPLC columns are given in Table 1.

TABLE-1

Specification HPLC columns packed with the various C18-silica materials

| HPLC Column | Particle Size μm | Surface Area m²/g | Pore Size Å | Carbon Coverage % | Packing Density g/ml |
|---|---|---|---|---|---|
| C18-60 | 10 | 540 | 60 | 18 | 0.54 |
| C18-100 | 10 | 420 | 100 | 16 | 0.54 |
| C18-300 | 10 | 170 | 300 | 8.1 | 0.51 |
| C18-700 | 10 | 32 | 700 | 5.2 | 0.51 |
| C18-1200 (a) | 10 | 23 | 1200 | 1.7 | 0.47 |
| C18-1200 (b) | 10 | 32 | 1200 | 4.1 | 0.51 |
| C18-1200 (c) | 10 | 46 | 1200 | 4.1 | 0.51 |
| C18-1500 | 10 | 18 | 1500 | NG | NG |

Instrumentation

The HPLC system was Agilent 1200 (USA) consisting of an auto-sampler, a quaternary pump solvent delivery system and an auxiliary isocratic pump. Agilent Chemstation software was used for instrument control, data acquisition. Microwave Plasma atomic emission spectrometer (MP-AES) from Agilent, USA was coupled to the HPLC system and used as detector.

Procedures

Impregnation of the various HPLC columns is conducted by allowing the ligand to be impregnated onto the column packing to flow the columns as described below.

Prior to the impregnation, organic solvent, such as isopropanol present in the column as provided from the producer had to be removed. The organic solvent was therefore first flushed out using deionized water and then the column was pre-conditioned with 3 M $HNO_3$ with at least 3 column volumes. This is followed by injecting 50 μL La $(NO_3)_3$ solution into the column and elute it with 3 M $HNO_3$ isocratically at a flow rate of 4 mL/min to determine the retention time T1. Then, the column was thoroughly flushed with water with at least 6 column volumes and the extractant (HDEHP) was percolated through the column at a flowrate within the operating column pressure (ΔP) for at least 10 column volumes. Percolation of the extractant is then stopped and the column is flushed with water for several hours (2-4 hours) to remove loosely bound extractant. After all loosely bound extractant is removed and a steady column pressure (ΔP) is obtained at maximum flowrate, the column is pre-conditioned with 3 M $HNO_3$ (at least 3 column volumes). This is followed by injecting 50 μL La$(NO_3)_3$ solution into the column and elute with 3 M $HNO_3$ at the flow rate of 4 mL/min to determine the retention time T2 after the impregnation. 3 M $HNO_3$ is strong enough so that La ion is not retained by extractant impregnated column and eluted at as front.

Calculations

Retention times T1 and T2, which are void times of the column before and after the impregnation, are used to calculate void volumes of the column before and after the impregnation using Eq-1 and Eq-2, respectively.

$$V1 \text{ (mL)} = T_1(\text{min}) \times U \text{ (mL/min)} \quad \text{Eq-1}$$

$$V2 \text{ (mL)} = T_2(\text{min}) \times U \text{ (mL/min)} \quad \text{Eq-2}$$

Where: V1 and V2 are void volumes of the column before and after impregnation, respectively, $T_1$ and T2 are retention times before and after the impregnation, respectively and U is mobile phase flowrate.

The void volumes V1 and V2 are used to calculate the amount of extractant retained in the column in mL (Ex-v), in grams (Ex-g) and in mmoles (Ex-mmole) using Eq-3, Eq-4 and Eq-5, respectively.

$$Ex\text{-}v \text{ (mL)} = V1 \text{ (mL)} - V2 \text{ (mL)} \quad \text{Eq-3}$$

$$Ex\text{-}g \text{ (g)} = V\text{-}ex \times D\text{-}ex \text{ (0.97 g/mL)} \quad \text{Eq-4}$$

$$Ex/\text{mmole (mmole)} = Ex\text{-}g \times 1000/322.14 \text{ g} \quad \text{Eq-5}$$

Where: Ex-v, Ex-g and Ex-mmole are amount of the extractant in the column in mL, grams and mmoles, V1 and V2 are void volumes of the column before and after the impregnation, D-ex is density of HDEHP and 322.14 is MW of the HDEHP Results and Discussion In the strive to maximize the amount of HDEHP (extractant) adsorbed on RP-silica support, thereby increasing the production capacity of extraction chromatography to commercially acceptable level, the effects of the different phase and particle parameters and impregnation conditions on adsorption efficiency of HDEHP on C18-silica materials, have been investigated. The initial assumption was that large surface area combined with high carbon coverage (since bare silica doesn't retain organic compounds like HDEHP) would lead to higher extractant adsorption. Since narrow pore silica particles have large surface area and the molecules of the extractants in question including HDEHP are much smaller and can easily enter into narrow pore size silica particles, two HPLC columns packed with C18-silica materials having 60 Å and 100 Å pore size, respectively (Table-2), were used during the initial investigation. In this test, it was also included a third HPLC column packed with wide pore (300 Å) C18-silica material (actually bought for unrelated purpose) out of curiosity. Due to significantly smaller surface area compared to the 60 and 100 Å much lower impregnation efficiency, was expected.

TABLE 2

HPLC columns packed with the various C18-silica materials used in the first investigation

| HPLC Column | Particle Size μm | Surface Area m²/g | Pore Size Å | Carbon Coverage % | Pack Density g/mL | Amount of HDEHP mmole/column |
|---|---|---|---|---|---|---|
| C18-60 | 10 | 540 | 60 | 18 | 0.54 | 12.9 |
| C18-100 | 10 | 420 | 100 | 16 | 0.54 | 11.1 |
| C18-300 | 10 | 170 | 300 | 8.1 | 0.51 | 22.6 |

It was unexpectedly found that the amount of HDEHP impregnated on the wide pore C18-300 column found to be about twice as much as impregnated on both C18-100 and C18-60 columns despite having less than half of the surface area and carbon coverage (Table-2). It is commonly accepted in the art of chromatography that a large surface area, and accordingly small pore size of the packing material is important for increasing the capacity and the resolution of the column [16]. It is stated in [16] that pore sizes of 150 Å or less is chosen for samples having a MW of ≤2000, and that pore sizes higher than 300 Å are chosen for samples having a MW≥2000.

The result was unexpected, and further studies were performed to investigate even wider pores (i.e., >300 Å). Such wide pore particles are regarded as a specialty and are normally used for making stationary phases consisting of polysaccharides. Such phases can separate between enantiomers. The reason in these cases for using so wide pores is simply that the polysaccharides, in difference from the above described extractants, are so large molecules that they need so wide pores to be able to enter these pores.

In the subsequent investigations, three HPLC columns packed with 700 Å, 1200 Å and 1500 Å pore size C18-silica materials were included. The result from these tests are shown in Table-3.

TABLE 3

HPLC columns packed with the various C18-silica materials used in the second investigation

| HPLC Column | Particle Size μm | Surface Area m²/g | PoreSize Å | Carbon Coverage % | Packing Density g/mL | Amount of HDEHP mmole/col |
|---|---|---|---|---|---|---|
| C18-700 | 10 | 32 | 700 | 5.2 | 0.51 | 28.1 |
| C18-1200 | 10 | 23 | 1200 | 1.7 | 0.47 | 30.7 |
| C18-1500 | 10 | 18 | 1500 | NG | NG | 27.2 |

As seen in Table-3, the amount of HDEHP impregnated on the adsorbent shows substantial increase with increasing pore size and reached a peak at 1200 Å. The amount of extractant retained by C18-1500 Å silica particle was found to be lower than both C18-1200 Å and C18-700 Å silica particles, but significantly higher than C18-300 Å silica particle (Table-2), implying that the optimum is between 700 Å and 1200 Å silica particles.

This initiated us to explore the effect of other parameters apart from pore size, such as surface area and carbon coverage. Hence, we got tailormade two more HPLC columns with the same pore size of 1200 Å (the best material thus far giving highest impregnation efficiency), but larger surface area of 32 and 46 m²/g, respectively and higher carbon coverage, and investigate the impregnation efficiency of the extractant using the same method described above.

The result from this test is presented in Table-4 along with that of C18-1200 column from the previous test for comparison. In order to easy differentiating, the three 1200 Å HPLC columns are designated as (a), (b) and (c).

TABLE 4

HPLC columns packed with the various C18-silica materials used in the third investigation

| HPLC Column | Particle Size μm | Surface Area m²/g | Pore size Å | Carbon Coverage % | Packing Density g/mL | Amount of HDEHP mmole/col |
|---|---|---|---|---|---|---|
| C18-1200 (a) | 10 | 23 | 1200 | 1.7 | 0.47 | 30.7 |
| C18-1200 (b) | 10 | 32 | 1200 | 4.1 | 0.51 | 31.4 |
| C18-1200 (c) | 10 | 46 | 1200 | 4.1 | 0.51 | 38.6 |

It is evident from Table-4 that for a given pore size, the impregnation efficiency of the extractant increases with increasing surface area and carbon coverage, implying that these parameters are also important factor influencing the impregnation efficiency in addition to pore size. This may also explain the slightly higher impregnation efficiency exhibited by C18-60 silica material compared to C18-100 silica material, which has larger pore size, but smaller surface area and carbon coverage (Table-2). Since bare silica doesn't retain organic compounds, neither large pore size nor high surface area is guaranteeing high impregnation efficiency. On the other hand, if not accessed by the extractant molecules, high carbon content (i.e., high hydrophobicity) alone will not result in higher impregnation of the extractant.

In the present case, the combination of all the above-mentioned parameters, namely "accessible hydrophobic surface" seems to be the factor affecting the impregnation efficiency. This is also in accordance with the result in Table-4 that shows C18-1200(c) particle with the highest surface area and carbon coverage also has the highest amount of retained HDEHP.

According to the literature, the size of HDEHP molecule as a dimer is estimated to be <3 Å. Given its very small size, the HDEHP molecules should be able to enter even into the pores of C18-60 Å particles, which has the narrowest pore size of all C18-silica materials studied in this work. The lower impregnation efficiency of HDEHP on narrow pore size, high surface area RP-silica particles remains unclear and warrants more investigation.

TABLE 5 percentage of amount of HDEHP impregnated on C18-silica particles of various pore size compared to 100 Å, C18-silica material

| HPLC Column | Particle Size μm | Surface Area m²/g | Pore Size Å | Carbon Coverage % | Amount of HDEHP mmole/col | Increase compared to C18-100 % |
|---|---|---|---|---|---|---|
| C18-100 | 10 | 420 | 100 | 16 | 11.1 | |
| C18-60 | 10 | 540 | 60 | 18 | 12.8 | 115 |
| C18-300 | 10 | 170 | 300 | 8.1 | 22.6 | 204 |
| C18-700 | 10 | 32 | 700 | 5.2 | 28.1 | 253 |
| C18-1200 (a) | 10 | 23 | 1200 | 1.7 | 30.7 | 277 |
| C18-1200 (b) | 10 | 32 | 1200 | 4.1 | 31.4 | 283 |
| C18-1200 (c) | 10 | 46 | 1200 | 4.1 | 38.6 | 348 |
| C18-1500 | 10 | 18 | 1500 | NG | 27.2 | 245 |

Table-5 compares the amount of HDEHP impregnated on the various C18-silica particles investigated in this work against 100 Å pore size C18-silica material, which is the most common pore size and typically used in liquid chromatography.

SUMMARY

The result achieved in this work, which led to nearly 350% increase in the amount of HDEHP impregnated on RP-silica material can be a game changer in industrial separation of REEs by bringing extraction chromatography to the field. As shown by Eq-7 discussed in the theory section of this paper, the capacity of ExC in terms of sample load has a direct third order dependence on the concentration of the extractant on the stationary phase and the greater the amount of the extractant means the greater the production capacity. This will effectively eliminate the limitation of ExC discussed earlier in this report and enable it to compete with the state-of-the-art LLE method as a green and cost-effective alternative for separation and purification of REEs.

The invention claimed is:

1. A stationary phase for preparative High Pressure Liquid Chromatography (HPLC) for preparative separation of Rare Earth Elements (REEs), the stationary phase comprising:

porous particles suitable for HPLC having a non-polar surface impregnated with ligands binding REEs;

wherein the porous particles are porous silica particles having a surface modified by alkyl groups to make the surface thereof non-polar and suitable for binding of ligands binding REEs; and wherein the alkyl groups have a chain length of 4, 8 or 18 C atoms, the porous particles have a pore size between 700 Å and 1200 Å, and the ligand binding REEs is an acidic organo-phosphorous compound.

2. The stationary phase according to claim 1, wherein the acidic organo-phosphorous compound is selected from di-(2-ethylhexyl) phosphoric acid (DHEHP), di-(2,4,4-trimethylpentyl) phosphinic acid (H[TMPeP]) and 2-ethylhexyl, 2-ethylhexyl phosphonic acid (H[(EH)EHP]).

3. The stationary phase according to claim 2, wherein the acidic organo-phosphorous compound is di-(2-ethylhexyl) phosphoric acid (DHEHP).

4. A method of using silica particles to prepare the stationary phase of claim 1 for separation of REEs, the silica particles having a pore size between 700 Å and 1200 Å, the method comprising: modifying the silica particles by binding of alkyl chains, with a chain length of 4, 8 or 18 C atoms, to the polar silica surface; and impregnating the modified silica particles with an acidic organo-phosphorous compound.

5. The method according to claim 4, wherein the acidic organo-phosphorous compound is selected from di-(2-ethylhexyl) phosphoric acid (DHEHP), di-(2,4,4-trimethylpentyl) phosphinic acid (H[TMPeP]) and 2-ethylhexyl, 2-ethylhexyl phosphonic acid (H[(EH)EHP]).

6. The method according to claim 5, wherein the acidic organo-phosphorous compound is di-(2-ethylhexyl) phosphoric acid (DHEHP).

* * * * *